July 9, 1929.  V. R. STEWART  1,720,454
LOCOMOTIVE VALVE GEAR
Filed June 13, 1928   3 Sheets-Sheet 1
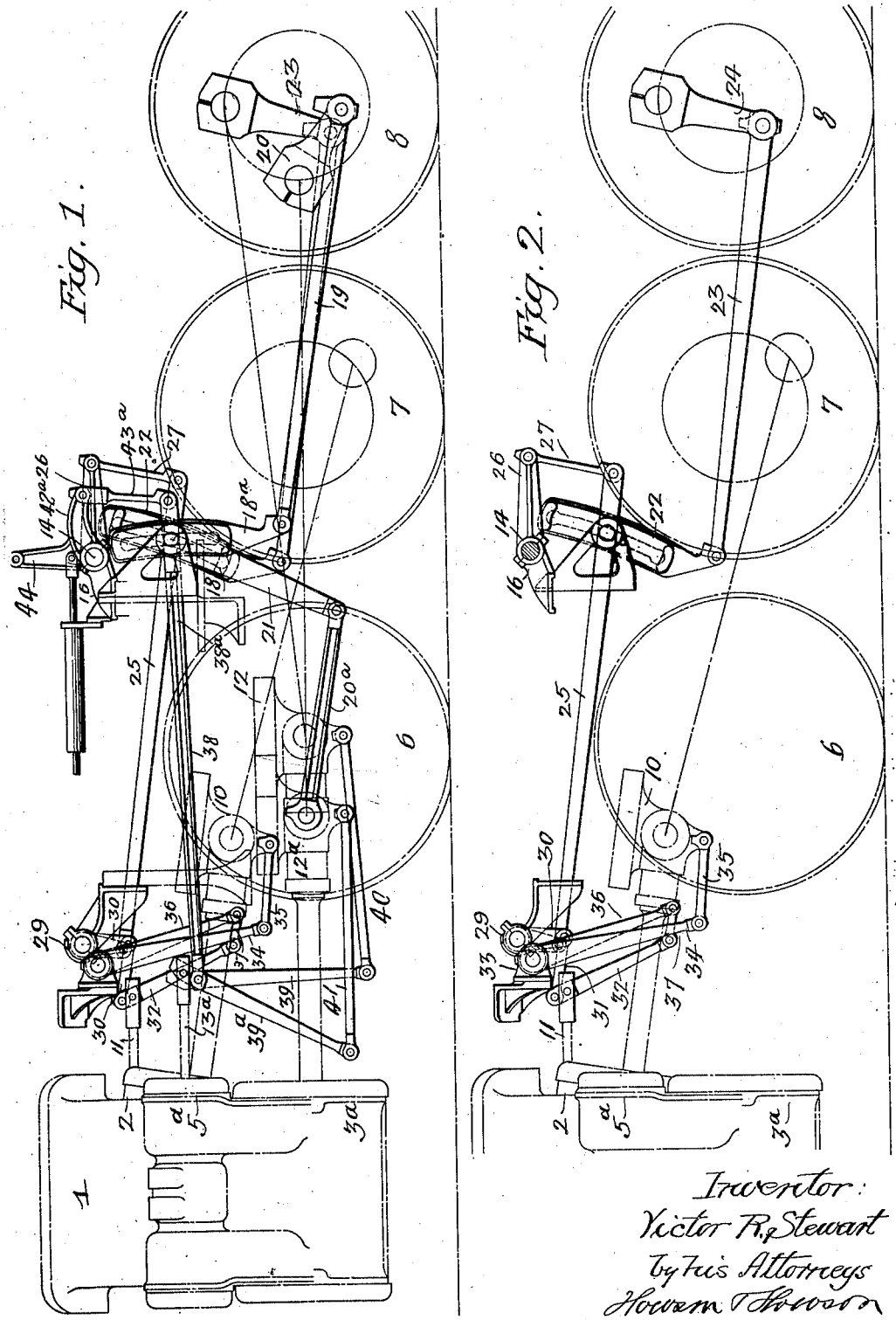

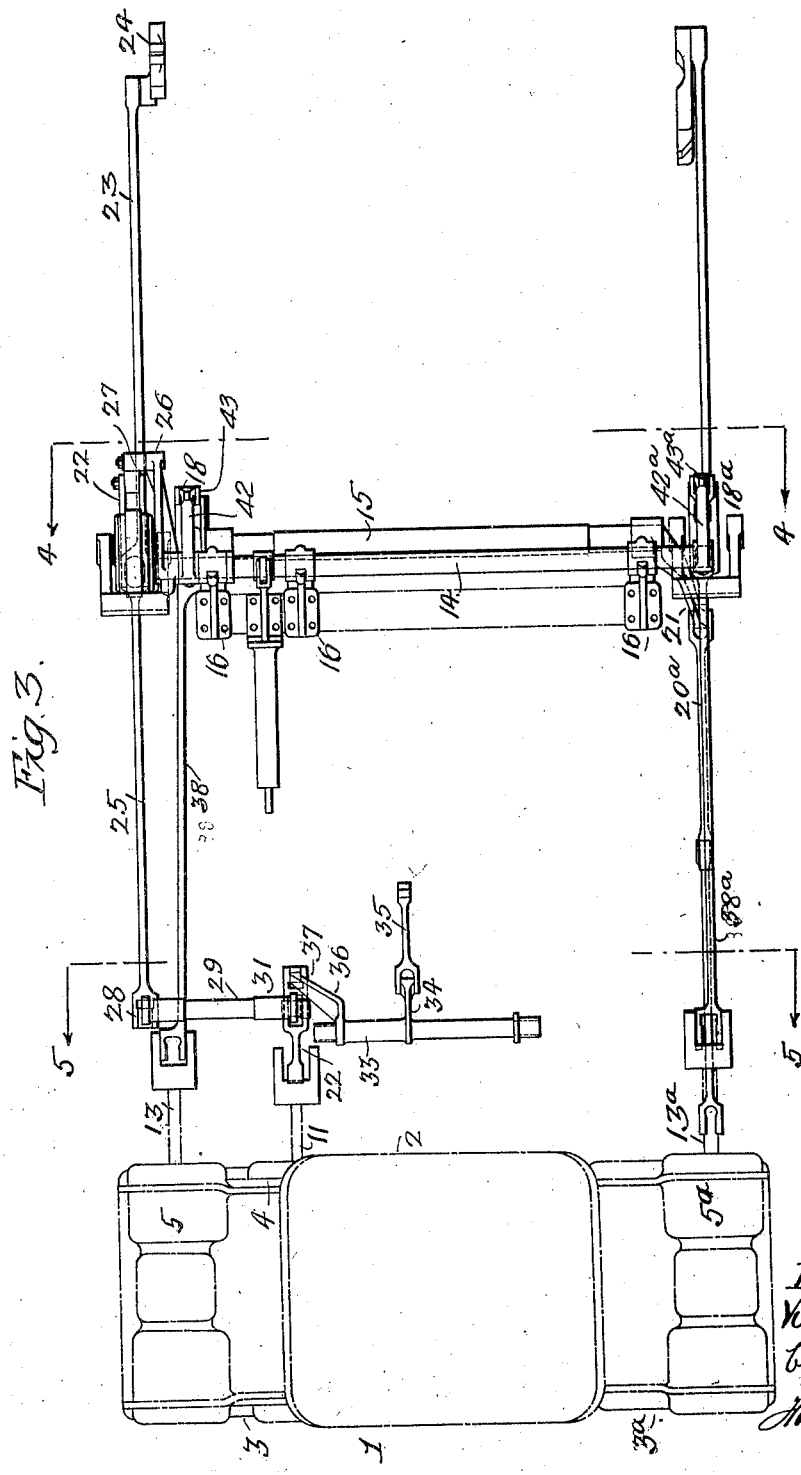

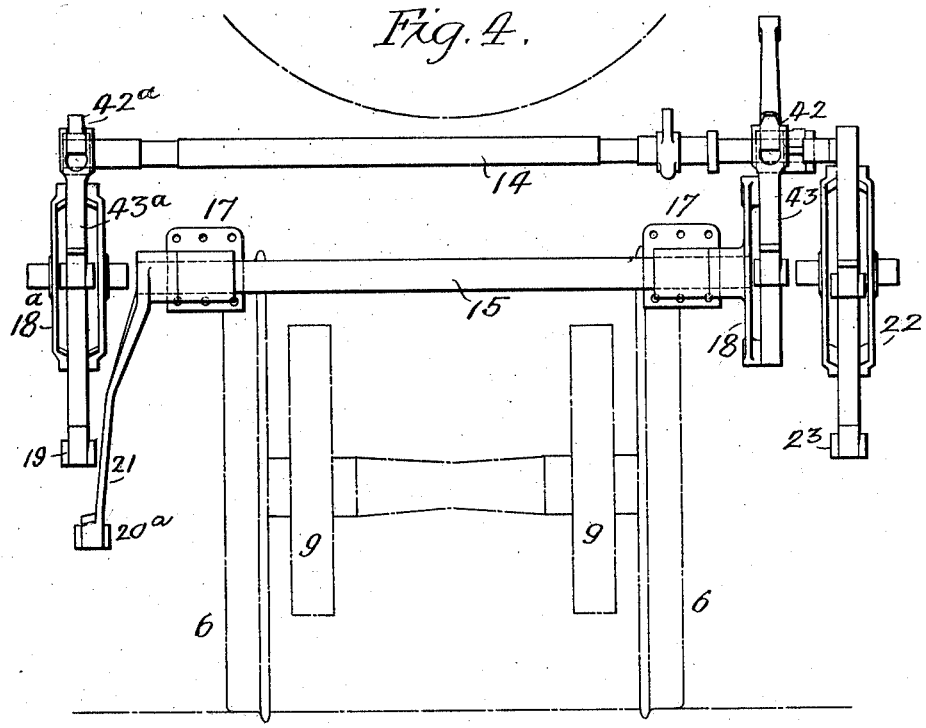
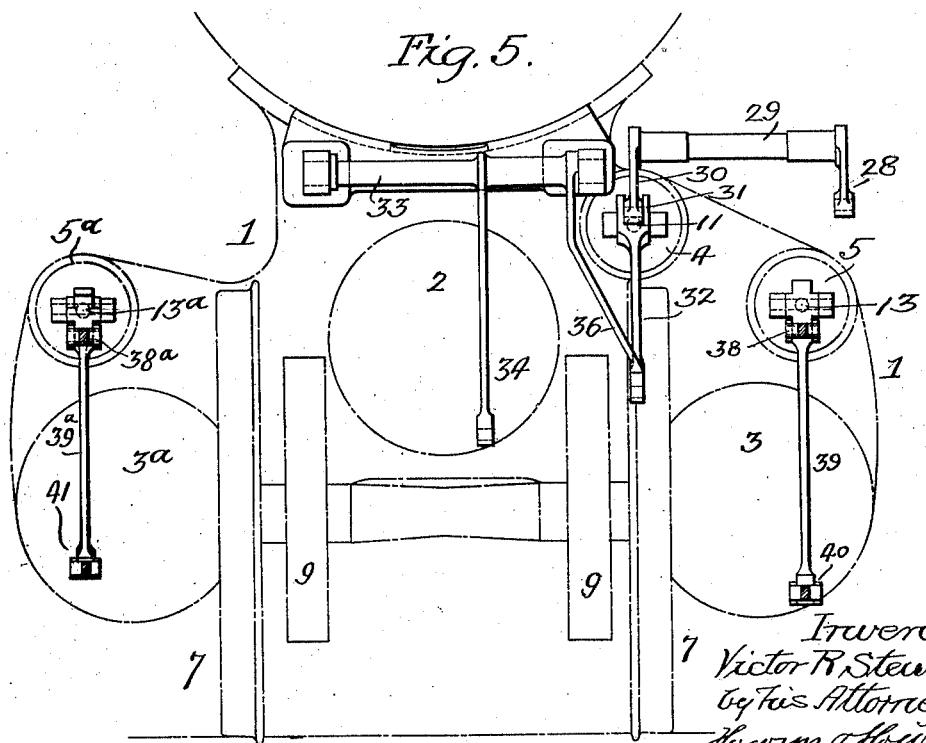

Patented July 9, 1929.

1,720,454

UNITED STATES PATENT OFFICE.

VICTOR R. STEWART, OF GLENSIDE, PENNSYLVANIA.

LOCOMOTIVE VALVE GEAR.

Application filed June 13, 1928. Serial No. 285,006.

My invention relates to certain improvements in three-cylinder locomotives of the compound type, in which the central cylinder is the high pressure cylinder and the two side cylinders are low pressure cylinders with cranks 90° apart.

The object of my invention is to provide means whereby the valve of the central or high pressure cylinder will be operated from the cross-head of said cylinder and from the cross-head of one of the side cylinders.

In the accompanying drawings:

Fig. 1 is a diagrammatic side view of sufficient of a locomotive to illustrate my invention, the view showing the valve mechanisms of the two side cylinders and the central cylinder;

Fig. 2 is a diagrammatic side view, showing only the valve mechanism of the central cylinder and its connection with the mechanism of one of the side cylinders;

Fig. 3 is a diagrammatic plan view;

Fig. 4 is a transverse sectional view on the line 4—4, Fig. 3; and

Fig. 5 is a transverse sectional view on the line 5—5, Fig. 3.

The cylinder structure 1 is shown by dotted lines in the several figures of the drawings, and in the structure is the central or high pressure cylinder 2, the two side cylinders 3—3ª which are the right and left low pressure cylinders, and the valve-chests 5—5ª of the side cylinders.

It will be understood that the cylinder structure may be made in any manner without departing from the essential features of my invention.

Three driving wheels 6, 7 and 8 are shown in the present instance, while the side frames 9 of the locomotive are illustrated by dotted lines in Figs. 4 and 5.

10 is the cross-head of the central cylinder 2, and 11 is the valve stem of its valve located in the valve-chest 4. 12 is the cross-head of the cylinder 3, and 12ª is the cross-head of the cylinder 3ª. 13—13ª are the valve stems of the valves of the two cylinders, respectively.

Extending across the locomotive are the link shaft 15 and the reverse shaft 14 mounted in bearings 16 and 17, respectively located on the side frames of the locomotive.

In this valve gear are three links. The left-hand link 18ª is connected by a rod 19 with the crank 20 on that side of the locomotive. The right-hand link 18 is mounted on the link shaft 15 and is actuated from the left-hand cross-head 12ª through a union link 20ª and an arm 21 on the link shaft 15.

The outside link 22 on the right-hand side is connected by a rod 23 with a crank 24 on that side of the locomotive. 25 is the middle link rod controlled by the outside link 22 and is raised and lowered by the reverse shaft 14 through an arm 26 and a lifting link 27. The opposite end of the link rod 25 is connected to an arm 28 on an outer rock shaft 29. On the opposite end of the rock shaft is an arm 30 which is connected by a link 31 to the short arm of a middle combining lever 32 pivoted to the head of the middle valve stem 11.

33 is an inner rock shaft having an arm 34 connected to the cross-head 10 of the middle cylinder 4 by a link 35, and on the inner rock shaft 33 is another arm 36 which is connected by a link 37 to the long arm of the middle combining lever 32.

By the above arrangement the valve of the middle cylinder 4 is actuated by the combined movement of the cross-head of the middle cylinder and the crank 24 on one of the driving wheels through a link motion.

38 and 38ª are the right and left link rods connected respectively to the combining levers 39 and 39ª of the right and left valve rods 13—13ª. The combining lever 39 is connected to the right-hand cross-head 12 by a link 40, and the combining lever 39ª is connected to the left-hand cross-head 12ª by a link 41.

The two link rods 38 and 38ª are adjusted in respect to the links 18—18ª by the reverse shaft 14 through arms 42—42ª and lifting links 43—43ª. On the shaft 14 is an operating arm 44 connected to mechanism at the cab of the locomotive.

I claim:—

1. The combination in a three-cylinder locomotive of the compound type, of a middle high pressure cylinder; two side low pressure cylinders; a valve for each cylinder; a piston and a cross-head for each cylinder; and reverse mechanism for each valve, the reverse mechanism of one of the side cylinders being operated from the cross-head of the opposite side cylinder, and the reverse mechanism of the middle valve and the other side valve being operated from cranks on one of the driving wheels of the locomotive.

2. The combination in a three-cylinder locomotive of the compound type, of a middle high pressure cylinder; two side low pressure cylinders; a valve for each cylinder; a piston and a cross-head for each cylinder; reverse mechanism for each valve, the reverse mechanism for the middle cylinder being actuated from the cross-head of said middle cylinder; and a crank on one of the driving wheels of the locomotive, the valve on that side of the locomotive in which the valve mechanism for the middle cylinder is mounted being actuated from the cross-head of the said cylinder on the opposite side of the engine, and the valve mechanism of the other cylinder being operated from the same side of the engine as the valve.

3. The combination in a valve gear for locomotives, of a middle cylinder having a piston and a cross-head; a valve for said cylinder; a valve stem; a combining lever pivotally connected to the head of the valve stem; reverse mechanism to which the short arm of said lever is connected; an inner rock shaft having an arm; and a link connecting said arm with the combining lever, said rock shaft having a second arm connected to the cross-head of the middle cylinder.

4. The combination in a valve gear for locomotives, of a middle cylinder having a piston and a cross-head; a valve for said cylinder; a valve stem; a combining lever pivotally connected to the head of the valve stem; an outer rock shaft; an arm on said rock shaft; a link connecting the arm of the outer rock shaft with the short arm of the combining lever, said rock shaft having a second arm; reverse mechanism connected to the second arm and actuated by a crank on one of the driving wheels of the locomotive; an inner rock shaft having two arms; a link connecting one of said arms with the combining lever; and a link connecting the other arm with the cross-head of the middle cylinder.

VICTOR R. STEWART.